Feb. 11, 1969   S. W. WOLFSON   3,426,811
DROP DISPENSING MEANS
Filed March 31, 1967
Fig. 1
Fig. 2
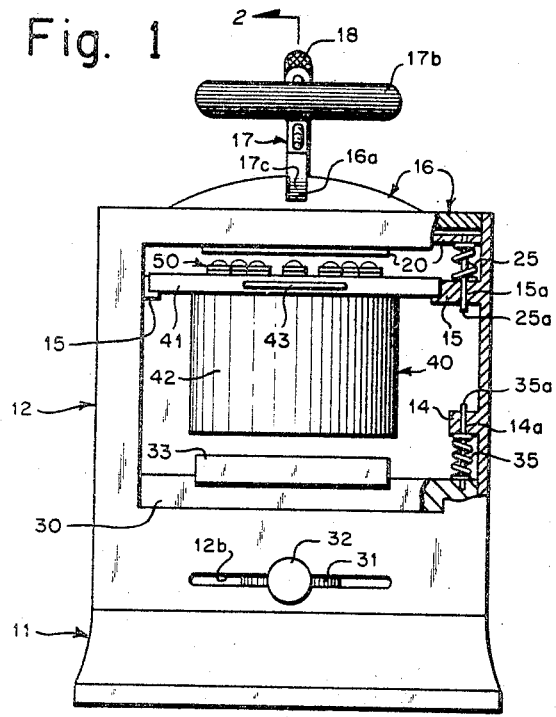
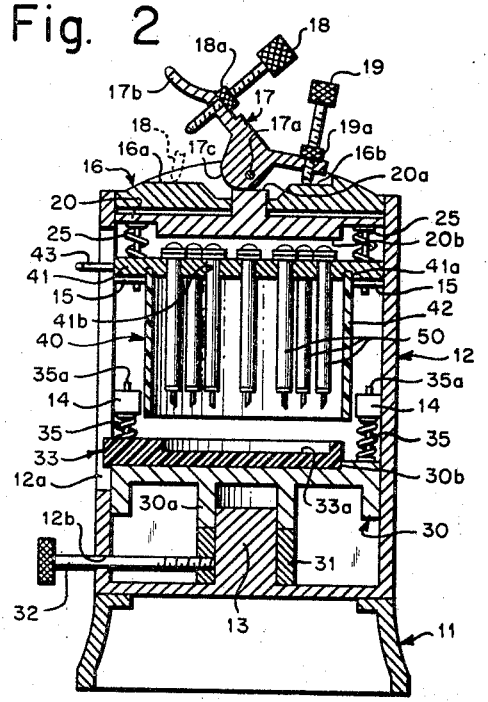
Fig. 4
Fig. 5
Fig. 6
Fig. 7
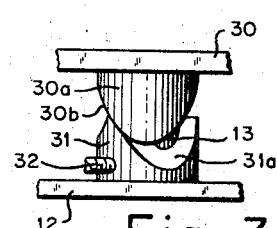
Fig. 3a
Fig. 3b
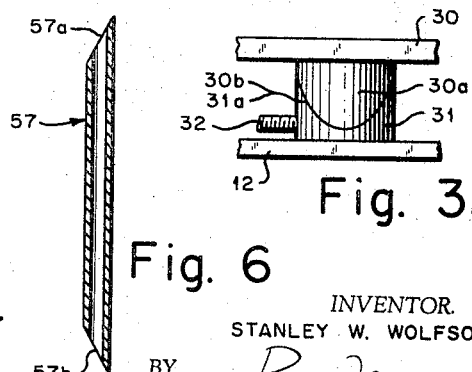
INVENTOR.
STANLEY W. WOLFSON
BY Paul Maleson
ATTORNEY

United States Patent Office 3,426,811
Patented Feb. 11, 1969

3,426,811
DROP DISPENSING MEANS
Stanley W. Wolfson, 15 Barone Road,
West Orange, N.J. 07052
Filed Mar. 31, 1967, Ser. No. 632,497
U.S. Cl. 141—234
Int. Cl. B65b 37/16, 3/04
8 Claims

ABSTRACT OF THE DISCLOSURE

An apparatus for simultaneously dropping approximately equal drops of liquid from each of a number of vials onto a surface. The vials generally contain different bacterial phages, and the surface is generally the surface of a petri dish containing Staphylococcus on a solid medium.

Background of the invention

A particular field of application of this invention lies in the field of medical laboratory work. In such work, it is frequently necessary to make comparative tests of a plurality of different biological cultures. This type of comparative testing has heretofore been performed by hand, or with the aid of several known devices. Such devices are disclosed for example in U.S. Patent No. 2,604,245 and U.S. Patent No. 2,865,156.

Summary of the invention

The drop dispensing apparatus accommodates a petri dish containing a culture on which a Staphylococcus virus for example is growing. The elevation of the petri dish is adjustably controllable. The dispenser also contains a rack or array of a plurality of substantially identical dispensing vials. Each of these vials contains a different phage. Phages are viruses which are parasitic for some microscopic organisms which themselves are harmful to humans. The specificity or preference that a particular phage demonstrates for a particular strain of Staphylococcus is a valuable item of information to determine.

The various different phages in liquid form are placed in the vials. Each vial is provided at the bottom with a finely made tube or needle, and at the top with a deformable elastomeric head. The array of vials in their holder is positioned in the dispenser above the petri dish. The precisely adjustable mechanism is provided above this array so that when the mechanism is operated, a uniform pressure is exerted on each of the deformable caps or heads of each vial, and a substantially uniform drop of phage from each vial is dispensed onto the surface of the petri dish. These droplets of phage are thus distributed in an ordered pattern on the surface of the culture medium, and the progress of each phage in attacking the Staphylococcus on the culture medium may be observed.

A great advantage of this invention is that a rapid and accurate plurality of tests of individual phages against the Staphylococcus may be simultaneously made with a minimum of precise care, chance of error and duplicated labor.

It is an object of the invention to provide an apparatus to contain a plurality of quantities of liquid, and to dispense approximately uniform drops of each of said quantities simultaneously and to successively repeat the said dispensing operation.

Other objects are made apparent in the following specification and claims.

Brief description of drawing

FIGURE 1 is a front view of the dispensing apparatus.

FIGURE 2 is a cross-sectional view taken along the line 2—2 of FIGURE 1.

FIGURE 3a is a fragmented elevational detailed view of the bottom part of the dispensing apparatus in its elevated position.

FIGURE 3b is a fragmented elevational detailed view of the bottom part of the dispensing apparatus in its lowered position.

FIGURE 4 is a plan view of the collar which holds the vials, showing only a representative number of the tops of the vials.

FIGURE 5 is an exploded elevational view, partly in cross-section, of a dispensing vial.

FIGURE 6 is a cross-sectional view of the needle used in the dispensing vial.

FIGURE 7 is an elevation view, partly in cross-section, of the stored form of part of the dispensing vial.

Description of the preferred embodiment

The dispensing vial is described first. This vial dispenses a single drop at a time, and is an element in the dispensing apparatus. By providing a plurality of these vials in the apparatus, described below, a multiple simultaneous dispensing a substantially equal drop is provided for.

Broadly, the dispensing device consists of a hollow elongated vial, container, or cartridge having a hollow needle extending from one end thereof and an elastic cap at the other end thereof. In FIGURE 5, a glass cartridge 54 is provided having a lip or flange 54a extending outwardly therefrom. A stopper 52 is provided to fit into the top of cartridge 54.

This stopper is divided with an exterior flange, and a domed upper surface 52a. The purpose of this dome or convexity is explained below. The interior of the stopper 52 is provided with a hollow 52c. The exterior of the base of the stopper is provided with longitudinal ribs 52b. These ribs 52b are provided because the cartridge 54 may be used to contain lyophilized materials, such as lyophilized virus, and stoppers for containers of this nature are customarily supplied with such ribs. The stopper 52 is made of rubber or other similar elastic material. The flange 52d is provided around the stopper.

A bottom plug 56 is provided to fit into the lower end of cartridge 54. This plug is provided with a flange 56a to prevent insertion of the plug all the way into cartridge 54. A hollow needle 57 is positioned longitudinally through bottom plug 56, extending from each end thereof. The bottom plug 56 is preferably provided with a partially hollow interior to ease needle insertion. This plug is generally made of rubber or some similar material.

In use, the bottom plug 56 and the stopper 52 are inserted into the ends of cartridge 54. The parts are shown separate in FIGURE 5 for ease in illustration. When cartridge 54 is loaded with a liquid and the bottom plug and stopper are inserted, the dispensing device is then ready for operation, as is described below.

In FIGURE 7, a hollow container 58 is shown. This container is provided with a fitting cover 59, and both container and cover are preferably made of a hard plastic. The container is provided for storing and shipping the bottom plug 56 as equipped with its needle 57. The plug and needle may be sterilized and then packaged asceptically in the container. To apply the sterile plug and needle to the cartridge 54, the cover 59 is removed and the plug 56 is allowed to remain in the container 58. This container is then aligned with cartridge 54 adjacent the lower end thereof, and the plug 56 may be inserted into the end of container or vial 54 by moving container 58 toward the end of the vial. Thus, the container in which the plug may be shipped and stored is also used to insert the plug into its operative position in the dispensing device without the plug being contaminated by contact with the operator's hands or other material. In FIGURE 5, the stopper container 58 is shown in the position from which it is moved toward vial 54 to insert plug 56 therein.

The hollow needle 57 is shown in greater detail in FIGURE 6. The needle 57, preferably made of steel, is provided with bevels 57a at one end and 57b at the other. The exact length and diameter of the needle are not critical. However, a needle of gauge 30 is satisfactory. By reference to FIGURE 5, it is seen that the upper edge of needle 57 projects above the intersecting surface of plug 56. It is important that this be so, whatever the exact configuration of the plug may be. The reason for this is explained below.

The vial 54 is filled or partially filled with a liquid, and is in operating condition when so filled or partially filled with the plug and stopper inserted. If pressure is now exerted on dome 52, liquid in vial 54 is expelled through needle 57 and forms a drop at the outer end of said needle. When the drop reaches a proper size, it detaches itself from the end of needle 57 and drops off. It has been found that throughout a wide variety of physical sizes of the parts, pressure on the dome 52 causes the expulsion of only one drop of liquid. When the pressure is released, air is sucked into vial 54 through needle 57. It is important for the purpose of maintaining consistent volume of dispensed drops, that the air drawn into the vial rise to the top of the liquid or at least not remain in or adhere to the needle 57. By providing the bevel 57a at the upper end of needle 57, and by insuring that the upper end of needle 57 extends beyond its line of intersection with the plug, the air drawn into the needle detaches itself and rises into the liquid.

To give some concept of operable and preferable dimensions, the vial 54 may be made with a 1.5 ml. capacity, and the needle of 27 gauge size. When the dome 52 is depressed, a drop of liquid is expelled with a volume of approximately $\frac{1}{140}$ ml. to $\frac{1}{125}$ ml. The most important factor in the size of the drop produced is the diameter or gauge of the needle. It is necessary that the other dimensions and physical constants of the dispensing device be such that a long enough "stroke" is possible to expel one drop. That is, for example, the diameter of the flexible elastic dome 52 must be great enough so that when it is depressed, a long enough "stroke" is produced. A wide range of reasonable sizes produce this result, and it is not believed that there is any critical aspect to the general dimensions except as specifically set forth.

It is now apparent that if vial 54 is loaded with a suitable liquid, drops of this liquid can be dispensed by simple relatively non-critical pressure on the stopper, the drops being produced with a high degree of uniformity of volume.

The dispensing machine is best initially described in connection with FIGURES 1 and 2. The dispensing machine is intended to permit the simultaneous deposit of a number of drops of liquid of approximately equal volume. Some particular applications and uses for this machine (as well as for the single dispensing device) are set forth below after the description of the illustrated embodiment of the machine.

The machine is generally constructed of metal, except for the vials, unless otherwise specified. A base 11 is provided and a frame 12 extends upwardly therefrom. The frame 12 is essentially a box-like structure with a large rectangular opening on one side thereof. FIGURE 1 is a view of the side having the large rectangular opening.

Also mounted on a base 11 and coacting with frame 12 are means to hold a surface intended to receive the dispensed drops. More particularly, these means comprise structure to hold and centrally position a petri dish and means to elevate it selectively. The petri dish holding means are best understood in connection with FIGURES 2, 3a, and 3b. A petri dish 33 having a recess 33a to hold a culture or other material rests on an elevating platform 30. Means are also provided for selectively changing the elevation of this plate above base 11.

These elevating means include a circular cam 31 adapted to fit over and rotate around a central stud 13 which forms an upward extension from the bottom portion of frame 12. The circular cam 31 has its upper face 31a cut or shaped so as to form a curve leading to a high position and receding to a low position, as is best seen in FIGURE 3a.

Another cam 30a, which may also be described as a circular or cylindrical cam, is positioned above cam 31, and has a lower face 30b, which is cut or shaped to match face 31a on cam 31. The upper circular cam 30a is a downwardly extending extension of the elevating platform 30. This is best shown in FIGURE 2. The elevating platform 30 extends horizontally across and within the confines of the upright walls of frame 12, and is free to slide vertically therein. Petri dish 33 rests on the upper surface of platform 30. At each corner of platform 30, a spring 35 is provided. Each spring 35 is provided with a central guide stem 35a. Each guide stem 35a is free to move vertically through its own spring block 14, to each of which the upper end of its spring 35 is affixed. Each spring block 14 is affixed to the adjacent portion of the vertical walls of frame 12.

As best shown in FIGURE 2, these springs 35 press resiliently downwards on the platform 30.

An elevating lever 32 is provided with a thread at one end to screw into a matching tapped hole in cam 31. At the outer end, elevating lever 32 is provided with a knurled knob. As best shown in FIGURE 1, a horizontal elongated slot 12b is provided in the face of the frame 12, below the large aperture, and lever 32 is thus free to be moved horizontally within the confines of that slot. It is apparent that by moving lever 32 in one direction, cam 31 is rotated around stud 13 so as to raise the upper cam 30a, and that by motion of the lever in the opposite direction, upper cam 30a is lowered. This motion in turn selectively raises and lowers the elevating platform and hence the petri dish positioned thereon.

In FIGURE 3a, cam 30a is shown in the elevated position, and in FIGURE 3b, it is shown in its most depressed position, with the cam faces 31a and 30b touching at all points.

Lever 32, in addition to being horizontally movable, is rotatable about its own axis, and by thus twisting it by means of its knurled knob, it can be caused to screw into cam 31 and brought to bear tightly against central stud 13. This locks the cams in the fixed chosen position. It is apparent that when the elevating platform is raised, it compresses the springs 35, and thus the compressive force of springs 35, together with the force of gravity, tends to return the raised platform to the most depressed position when the elevating lever 32 is twisted so as to unlock. The compressive resistance of springs also serves to progressively increase the force necessary to raise the elevating platform so as to reduce the possibility of raising the platform too suddenly and bringing the contents of the petri dish into contact with the needles 57. It is apparent that a petri dish may be placed on the plate 33 or removed therefrom, at will through the large aperture in frame 12.

A dropping unit generally designated 40 comprises a number of different elements, as described below. It includes a yoke or collar 41. This is a metal plate, preferably of rectangular shape. It is provided with a plurality of holes therethrough. These holes are arranged in an ordered pattern, preferably a circular pattern. It is provided with a handle 43 which extends outward through the large rectangular aperture in frame 12. A vial 50 fits through each of the apertures 41b in the yoke 41. Each vial passes freely downwardly from the top, until the vial's flange 54a hangs up on the top of the yoke. The structure of the lip or flange 54a on each vial 54 is shown in FIGURE 5 and has been described.

Thus, a vial 50 hangs downwardly through each of the apertures in yoke 41. The general disposition of these vials is shown in FIGURES 2 and 4. FIGURE 4 shows a view from below of the yoke with a relatively small number of vials arranged in a preferably circular array or pattern. A larger number of vials, such as 24 or 30, is preferable, although the exact number of holes or apertures 41b and the vials depending therefrom is not critical.

As best shown in FIGURE 1, the frame 12 is provided with a pair of rails, one on each side of the large aperture. As shown, these rails are near the top of the frame 12, and are preferably integral with the walls of the frame. Each rail presents an L-shaped slide section into which the yoke or collar 41 slidably fits. It is thus apparent that the yoke 41 may be inserted or removed from its position on the rails 15 by grasping the handle 43. It is also apparent that vials 50 may be placed or removed from the yoke freely when the yoke is removed from the confines of the frame 12.

A cylindrical plastic shield 42 is provided depending downwardly from the bottom side of yoke 41. As best shown in FIGURES 1, 2, and 4, this shield encloses the pattern of the vials. It is open at the bottom. A ring-shaped indentation 41a is provided in the lower surface of yoke 41 to receive the upper edge of the shield 42.

The rails 15 are each provided with a pair of vertical apertures 15a therethrough. As best shown in FIGURE 2, each rail has an aperture 15a near each end thereof. A spring guide stem 25α is affixed to a pressure plate, described below, and extends downwardly through each of the vertical apertures 15a with a sliding fit. Around each spring guide stem 25a and between the bottom surface of the pressure plate and the top surface of the rails 15 is affixed a spring 25, as best shown in FIGURE 1. Thus, there is a spring near each corner of the box-like structure defined by the frame 12, near the top thereof.

A pressure plate 20 is provided above the rails, above the normal position of the yoke 41, and below the upper surface of the frame 12, the upper surface being generally designated 16.

The pressure plate 20 is generally rectangular having a lower actuating surface 20b and an upper central stud 20a. It is seen that the pressure plate 20 is free to have limited vertical movement downwardly against the resistance of the springs 25.

A pressure plate actuating mechanism is provided on the upper surface 16 of frame 12. The actuating mechanism generally designated 17 is a rocking member pivoted for limited rotation around pivot shaft 17a which in turn is affixed to bearings in the upper surface or cover 16. The actuating mechanism 17 includes a cam 17c which is generally adjacent and below the pivot shaft 17a. This cam 17c bears against the top of the stud 20a.

The actuating mechanism 17 is extended frontwardly towards the large aperture in the front of frame 12 to form a pressure handle 17b. This handle includes a threaded aperture to receive a down travel limiting adjustment screw 18. A stop nut 18a is provided to set the position of the adjustment screw 18 through handle 17b.

When pressure handle 17b is depressed, the actuating mechanism pivots around shaft 17a and cam 17c presses downwardly on stud 20a against the resistance of springs 25. The travel is limited by the lower end of the adjustment screw 18 striking the down travel stop surface 16a provided on cover 16. The position of the handle and the down travel adjustment screw in the most depressed position are shown in phantom lines in FIGURE 2.

The rear of the actuating mechanism 17 is extended and contains a threaded aperture to accommodate the up travel limiting adjustment screw 19. This screw is provided with a stop nut 19a which adjusts its relationship to the actuating mechanism 17. When the pressure handle 17b is released, the resilience of the springs 25 force the pressure plate and hence the stud 20a upward. This bears against the cam and tends to rotate the actuating mechanism so that the up travel limiting adjustment screw 19 moves downwardly until it is stopped by the up travel stop surface 16b provided on cover 16.

It is thus apparent that the actuating mechanism may be adjusted so that the desired amount of pressure is brought to bear on the domed upper surface 52a of the stopper 52 of each vial. By adjusting the screw 18, the amount of stroke or compression exerted against each of the domes 52a may be regulated. Adjustment of the up-travel screw 19 adjusts the amount of clearance provided for any given set of vials. By providing a convex or domed top 52a a greater length of stroke is possible without depressing a stopper into the body of the vial. This provides for easier overall actuation and also provides more positive control of the drop expulsion.

In use, a petri dish is prepared with agar or some other culture medium or broth and may typically have a Staphylococcus strain thereon. The dropping means or cartridge rack may be removed from the apparatus by means of handle 43. Each cartridge or vial 50 is loaded with a different phage for example, and the stoppers 52 are replaced on each cartridge. Cartridges are positioned in the proper predetermined holes in the yoke or collar 41. The cartridge rack is then replaced in the apparatus on rails 15. Preferably, an index mark, as may be made by a grease pencil, is provided on the bottom of the petri dish and this is lined up with an index mark on the surface of the elevating platform 30. The elevating lever 32 is then moved to raise the surface of the petri dish a predetermined distance below the level of the bottoms of the needles 57. A one quarter inch spacing is satisfactory. The adjusting screws 18 and 19 are set to give the proper stroke. The amount of stroke can be determined by trial runs with the actuating mechanism and the vials before the petri dish is put in position. For example, the adjusting screws may be set so that when the pressure handle 17b is depressed with a steady motion to a time of about one second, a single drop will form and detach itself from the bottom of each needle 57.

The drops are free-falling and are therefore of constant volume, but because of the controlled length of drop, there is no splashing or rolling on the surface.

Thereafter, the process follows known techniques. For example, the petri dishes or plates may be dried and incubated in the usual manner. The progress of the effect of each of the drops on the surface may be observed and measured at any standardized time. A light box may be used to illuminate the surface of the petri dish for examination.

The scope of this invention is to be determined by the appended claims and is not to be limited to the described and illustrated embodiment, which is intended to be illustrative.

I claim:

1. A drop dispensing apparatus for simultaneously dropping a plurality of substantially equal volume drops a selectively predetermined distance to a prepared surface, comprising:

a base, elevating means on said base, said elevating means including an elevating platform to support a drop-receiving surface and means to selectively fix the elevation of said elevating platform with respect to said base, a frame on said base, said frame including walls and a cover, an opening in one of said walls, a cartridge rack within said frame, means to support said cartridge rack within said frame in a sliding relationship, said opening being large enough to accommodate sliding insertion and withdrawal of said rack and said prepared surface into and from said frame, said cartridge rack comprising a yoke having a plurality of holes therethrough in a patterned array and a shield depending downwardly therefrom and surrounding said array, a plurality of cartridges in said rack, each said cartridge removably supported on said rack and depending downwardly from said rack through a corresponding one of said holes, each said cartridge including a cartridge body, a hollow needle at the lower end thereof, and a domed elastic stopper at the upper end thereof, each said stopper projecting above said yoke, a vertically movable pressure plate within said frame below said cover and above said cartridge rack, actuating mechanism on said cover to depress said pressure plate a selected predetermined distance to simultaneously contact and deform each of said stoppers a substantially equal amount.

2. A drop dispensing apparatus as set forth in claim 1 wherein said pressure plate has an upwardly extending stud, and said actuating mechanism includes a pivoted eccentric cam bearing agaist the top of said stud and a pressure handle extending from said cam to rotate said cam around said pivot to depress said stud and hence said pressure plate.

3. A drop dispensing apparatus as set forth in claim 2 wherein said actuating mechanism is provided with a down travel limiting adjustment screw to selectively limit the distance said pressure handle may be depressed and hence the distance said pressure plate is depressed and an up travel limiting adjustment screw to selectively limit the extent to which said pressure handle may be raised and hence provide an upward position limit for said pressure plate.

4. A drop dispensing apparatus as set forth in claim 3 wherein a plurality of springs are provided affixed to and within said frame beneath said pressure plate, each of said springs bearing upwardly in compression against said pressure plate.

5. A drop dispensing apparatus as set forth in claim 4 wherein said elevating means includes an upper cam, a mating lower cam, said upper cam being affixed to and below said elevating platform, and said lower cam being mounted for rotation, means to rotate said lower cam and lock said lower cam in position, to selectively raise and lower said elevating platform.

6. A drop dispensing apparatus as set forth in claim 5 wherein a second plurality of springs are provided within and affixed to said frame, each of said second plurality of springs bearing downwardly in compression on said elevating platform.

7. A drop dispensing apparatus as set forth in claim 6 wherein each said cartridge body is provided with a flange at the upper end thereof, each said flange being larger than the corresponding hole in said yoke, and each said hollow needle extending through a bottom plug, said bottom plug being positioned in the bottom of said cartridge body.

8. A drop dispensing apparatus as set forth in claim 7 wherein each said needle is provided with a beveled lower end to facilitate separation of a drop from said needle, and a beveled said upper end to facilitate separation of an air bubble from said needle.

References Cited

UNITED STATES PATENTS 2,794,415  6/1957  Hillman _____ 118—411 X

HOUSTON S. BELL, JR., *Primary Examiner.*

U.S. Cl. X.R.

141—266